United States Patent
Wang

(10) Patent No.: US 10,504,202 B2
(45) Date of Patent: Dec. 10, 2019

(54) METHOD AND DEVICE FOR IDENTIFYING WHETHER STANDARD PICTURE CONTAINS WATERMARK

(71) Applicant: Tencent Technology (Shenzhen) Company Limited, Shenzhen (CN)

(72) Inventor: Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 76 days.

(21) Appl. No.: 15/945,613

(22) Filed: Apr. 4, 2018

(65) Prior Publication Data
US 2018/0225800 A1 Aug. 9, 2018

Related U.S. Application Data

(63) Continuation-in-part of application No. PCT/CN2017/070677, filed on Jan. 9, 2017.

(30) Foreign Application Priority Data

Jan. 21, 2016 (CN) .......................... 2016 1 0038952

(51) Int. Cl.
*G06K 9/00* (2006.01)
*G06T 1/00* (2006.01)
(Continued)

(52) U.S. Cl.
CPC .......... *G06T 1/0021* (2013.01); *G06K 9/2063* (2013.01); *G06K 9/4604* (2013.01);
(Continued)

(58) Field of Classification Search
CPC .. G06K 9/2063; G06K 9/4604; G06T 1/0021; G06T 1/005; G06T 2201/0051; G06T 2201/0065; H04N 1/32149; H04N 1/32267
See application file for complete search history.

(56) References Cited

U.S. PATENT DOCUMENTS

2003/0012402 A1* 1/2003 Ono ...................... G06T 1/0064
382/100
2010/0034469 A1 2/2010 Thorpe et al.
(Continued)

FOREIGN PATENT DOCUMENTS

CN 1291041 A 4/2001
CN 103870597 A 6/2014
(Continued)

OTHER PUBLICATIONS

Tencent Technology, Written Opinion, PCT/CN2017/070677, dated Apr. 11, 2017, 6 pgs.
Tencent Technology, IPRP PCT/CN2017/070677, dated Jul. 24, 2018, 7 pgs.
Tencent Technology, ISR, PCT/CN2017/070677, dated Apr. 11, 2017, 2 pgs.

*Primary Examiner* — Xin Jia
(74) *Attorney, Agent, or Firm* — Morgan, Lewis & Bockius LLP

(57) ABSTRACT

A method for identifying whether a standard picture contains a watermark is provided. After obtaining a set of sample standard pictures, one or more sample pictures in the set of sample standard pictures are adjusted to a preset size. The sample pictures in the set of sample standard pictures do not contain watermark information. Next, an average of pixel attribute values of the sample pictures at pixel positions of the preset size is calculated. The average of the pixel attribute values at the pixel positions of the preset size is normalized to obtain the watermark-presence probabilities of the pixel positions of the preset size. Then, a target picture is adjusted to the preset size and a sum of products of pixel (Continued)

attribute values of the target picture at the pixel positions of the preset size and the corresponding watermark-presence probability are calculated. Finally, it is determined whether the target picture contains a watermark according to the sum of products.

20 Claims, 4 Drawing Sheets

(51) Int. Cl.
  *H04N 1/32* (2006.01)
  *G06K 9/20* (2006.01)
  *G06K 9/46* (2006.01)
(52) U.S. Cl.
  CPC ......... *G06T 1/005* (2013.01); *H04N 1/32149* (2013.01); *H04N 1/32267* (2013.01); *G06T 2201/0051* (2013.01); *G06T 2201/0065* (2013.01)

(56) References Cited

U.S. PATENT DOCUMENTS

| | | | |
|---|---|---|---|
| 2011/0058188 A1* | 3/2011 | Guo | H04N 1/32224 358/1.9 |
| 2014/0016817 A1* | 1/2014 | Nakagata | H04N 19/467 382/100 |
| 2015/0030201 A1 | 1/2015 | Holub et al. | |

FOREIGN PATENT DOCUMENTS

| | | | | |
|---|---|---|---|---|
| CN | 104268822 A | | 1/2015 | |
| CN | 104484850 A | | 4/2015 | |
| CN | 104504639 A | | 4/2015 | |
| CN | 104915918 A | * | 9/2015 | ............... G06T 1/00 |
| CN | 103870597 A | * | 6/2018 | ............. G06F 17/30 |

* cited by examiner

Non-mesh watermark identity photo    Mesh watermark identity photo

METHOD AND DEVICE FOR IDENTIFYING WHETHER STANDARD PICTURE CONTAINS WATERMARK

PRIORITY CLAIM AND RELATED APPLICATION

This application is a continuation-in-part application of PCT/CN2017/070677, entitled "METHOD AND DEVICE FOR RECOGNIZING WHETHER IMAGE COMPRISES WATERMARK" filed on Jan. 9, 2017, which claims priority to Chinese Patent Application No. 201610038952.1, filed with the State Intellectual Property Office of the People's Republic of China on Jan. 21, 2016, and entitled "METHOD AND DEVICE FOR RECOGNIZING WHETHER IMAGE COMPRISES WATERMARK", both of which are incorporated herein by reference in their entirety.

FIELD OF THE TECHNOLOGY

The present disclosure relates to the technical field of computers, and in particular, to a method and device for identifying whether a standard picture contains a watermark.

BACKGROUND OF THE DISCLOSURE

In the existing technology, an IT system generally uses various standard pictures to facilitate identification by a machine during service transactions. For example, passport photo pictures, identity card pictures, social security card pictures, and driver's license pictures are often used for facilitating online transactions of a bank service, a financial service, and a social serving service. Frequently, digital documents that capture pages or photographs of paper identification documents via scanning or photographing means are also used to facilitate identification by machines during the service transactions. A relatively high resolution and non-shielding of key information of a standard picture usually need to be guaranteed since the standard picture is usually saved as a supporting document or used for machine identification, so that no ambiguity or false judgment of machine identification is generated. Therefore, generally there should not be interference information such as a watermark in a standard picture. The watermarks typically included on standard ID pictures often includes a pattern that spans the entire picture, but the features in the watermark is usually very fine and widely spaced, such that their presence do not prohibit general visual inspection of the standard ID pictures.

In the conventional technology, to identify a watermark contained in a standard picture document, generally an edge detection method is used for obtaining profile information of the standard picture, and then whether a profile satisfying watermark features (for example, diagonal texts, meshes, and super-large texts, referring to FIG. 1; Note: a mosaic is applied to the facial area in the image of the standard picture to protect personal privacy of the person in the standard picture, the mosaic pattern is not part of the actual standard picture or watermark), thereby identifying a watermark in the standard picture.

The method for identifying whether a standard picture contains watermark information in the conventional technology at least has the following problem: a portrait area in a standard picture, for example, in an identity card picture, usually further includes backgrounds such as clothes, and profile information that may cause interference with the identification of the watermarks is easily introduced by the presence of clothing in the standard picture, thereby resulting in false determination, and causing program failure or transaction failure, and wasted time and computing resources. In addition, the image processing involved in edge detection is processor and memory intensive, and require a powerful computer to perform, which prevents it from being used in terminal devices that have limited processing power and memory. Furthermore, the results produced by edge detection techniques are inconsistent, and a systematic error reduction technique cannot be applied to remedy the false detection results. Therefore, the accuracy of the method for identifying whether a standard picture contains watermark information in the conventional technology is not sufficient.

SUMMARY

Based on the above, to resolve the technical problem in the conventional technology of low identifying accuracy resulting from that identifying of whether a standard picture contains watermark information is apt to be interfered with by a human body or textures in clothes, a method for identifying whether a standard picture contains a watermark is particularly provided herein. The disclosed method utilizes gradient information across the entirety of the standard picture, and contrast the gradient information to statistical gradient information for known standard pictures without watermarks, and apply a filter to the gradient information differences such that gradient variations in the smooth regions of the standard picture are given more weight than gradient variations in the facial and body portions of the person in the standard picture when calculating the probability that the standard picture includes watermark. These calculations require less processing power and memory usage, and is more accurate than the conventional edge detection techniques in determining whether a standard picture includes watermarks. Consequently, the reliability of machine-based identity verification is increased, resulting improved efficiency and reduced cost in facilitating the machine-based transactions.

A method for identifying whether a standard picture contains a watermark includes:

obtaining a set of sample standard pictures, and adjusting sample pictures in the set of sample standard pictures to a preset size, the sample pictures in the set of sample standard pictures not containing watermark information;

calculating an average of pixel attribute values of the sample pictures in the set of sample standard pictures at pixel positions of the preset size;

normalizing the average of the pixel attribute values at the pixel positions of the preset size and obtaining watermark-presence probabilities of the pixel positions of the preset size; and obtaining a target picture that is adjusted to the preset size, calculating a sum of products of pixel attribute values of the target picture at the pixel positions of the preset size and the corresponding watermark-presence probability, and determining according to the sum of products whether the target picture contains a watermark.

In an embodiment, the pixel attribute values are gray gradient values; and before the step of calculating an average of pixel attribute values of the sample pictures in the set of sample standard pictures at pixel positions of the preset size, the method further includes:

calculating the gray gradient values of the sample pictures in the set of sample standard pictures at the pixel positions of the preset size.

In an embodiment, the pixel attribute values are differences between gray values and background gray values; and before the step of calculating an average of pixel attribute values of the sample pictures in the set of sample standard pictures at pixel positions of the preset size, the method further includes:

converting the sample pictures in the set of sample standard pictures into gray pictures according to the background gray values.

In an embodiment, the pixel attribute values are gray values; and before the step of calculating an average of pixel attribute values of the sample pictures in the set of sample standard pictures at pixel positions of the preset size, the method further includes:

converting the sample pictures in the set of sample standard pictures into binary pictures according to the gray values.

In an embodiment, the step of normalizing the average of the pixel attribute values at the pixel positions of the preset size includes:

obtaining a maximum value of the average of the pixel attribute values at the pixel positions of the preset size, calculating a ratio of the average of the pixel attribute values at the pixel positions of the preset size to the maximum value, and obtaining probabilities corresponding to the pixel positions of the preset size.

In an embodiment, the step of obtaining watermark-presence probabilities corresponding to the pixel positions of the preset size includes:

calculating complementary event probabilities of probabilities corresponding to the pixel positions of the preset size as the watermark-presence probabilities corresponding to the pixel positions of the preset size.

In an embodiment, the step of determining whether the target picture contains a watermark according to the watermark-presence probability evaluation value further includes:

determining whether the watermark-presence probability evaluation value is larger than or equal to a threshold, and determining that the target picture contains a watermark if the watermark-presence probability evaluation value is larger than or equal to the threshold.

In addition, to resolve the technical problem in the conventional technology of low identifying accuracy resulting from that identifying of whether a standard picture contains watermark information is apt to be interfered with by a human body or textures in clothes, a device for identifying whether a standard picture contains a watermark is particularly provided.

By implementing the embodiments of the present technology, the following beneficial effects are obtained:

By using the method and device for determining whether a standard picture contains a watermark, first, respective watermark-presence probabilities at all (or substantially all) pixel positions of a preset size that greatly differ from pixel attribute values of the background region are obtained according to a set of sample standard pictures without watermarks, an input target picture is then received, and a sum of products of pixel attribute values at all (or substantially all) pixel points in the target picture and the watermark-presence probabilities at the corresponding pixel positions are then calculated. Since the watermark-presence probability of occurrence of pixel attribute value change in the pixel attributes on a human face or clothes is small, and therefore, interference of profile information of the human face or clothes on watermark identification becomes negligible. As regards the watermark information in the background region, the watermark-presence probability is relatively large. If a watermark appears in the background region, relatively large pixel attribute values appear in the region. The relatively large pixel attribute values are then multiplied with relatively large watermark-presence probabilities, and then the products are summed that results in a relatively large sum value. Therefore, whether the standard picture contains a watermark can be determined according to the result of the relatively large sum. Moreover, since profile lines existing in the human face and clothes are filtered out (e.g., due to their negligible product values), the determining result is more accurate.

BRIEF DESCRIPTION OF THE DRAWINGS

To describe the technical solutions of the embodiments of the present technology or the existing technology more clearly, the following briefly introduces the accompanying drawings required for describing the embodiments or the existing technology. Apparently, the accompanying drawings in the following description show only some embodiments of the present technology, and a person of ordinary skill in the art may still derive other drawings from these accompanying drawings without creative efforts.

Herein.

DESCRIPTION OF EMBODIMENTS

Figure 1:
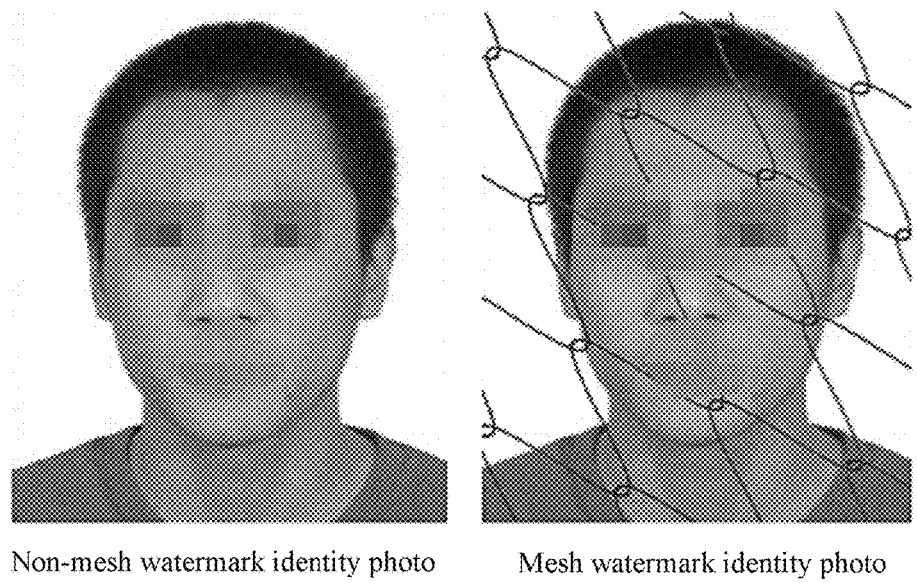
FIG. 1 is a comparison diagram of standard pictures with and without a watermark.
Figure 2:
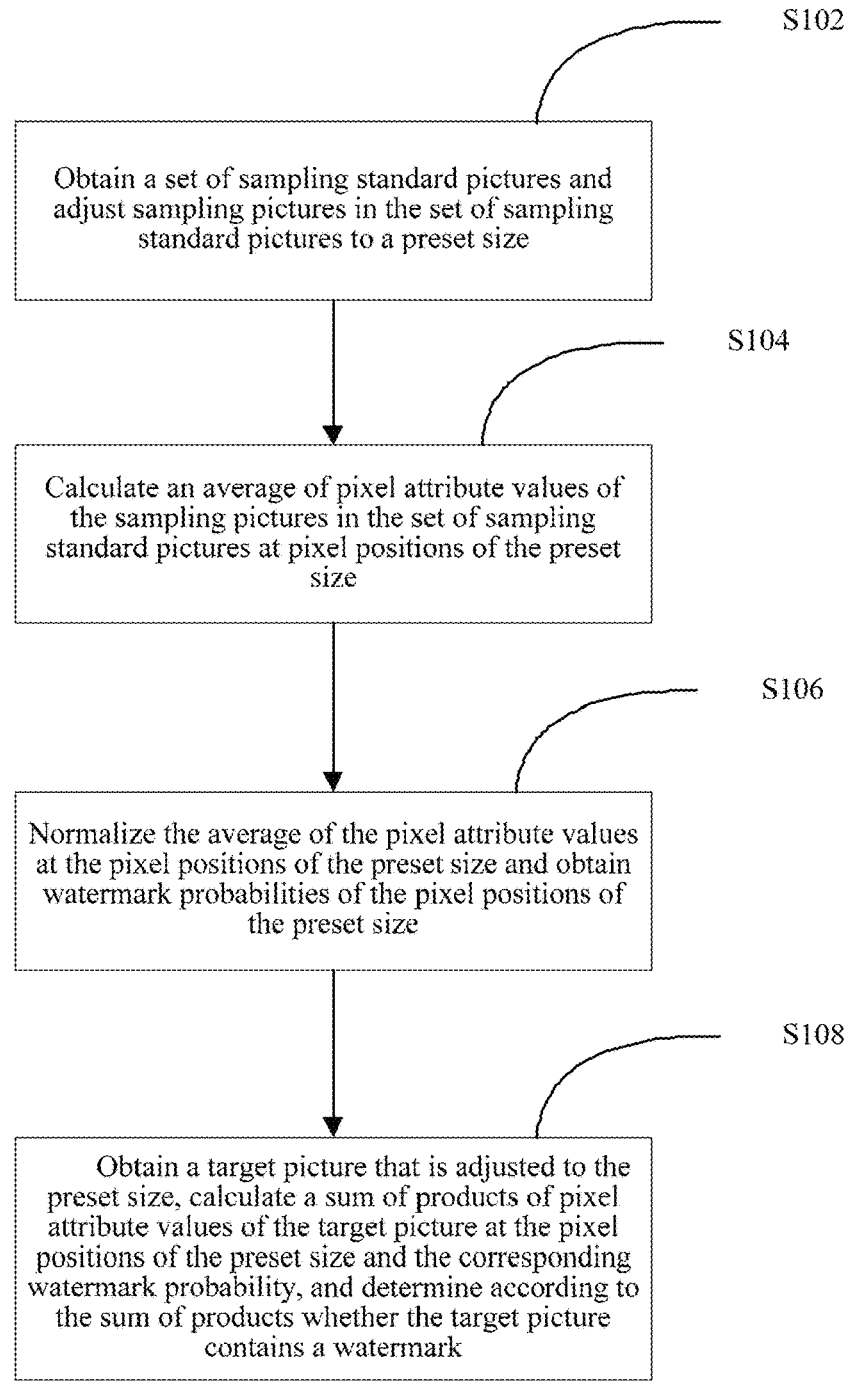
FIG. 2 is a flow chart of a method for identifying whether a standard picture contains a watermark according to an embodiment.

The following clearly and completely describes the technical solutions in the embodiments of the present technology with reference to the accompanying drawings in the embodiments of the present technology. Apparently, the described embodiments are some of the embodiments of the present technology rather than all of the embodiments. All other embodiments obtained by a person of ordinary skill in the art based on the embodiments of the present technology without creative efforts shall fall within the protection scope of the present disclosure.

To resolve the technical problem in the conventional technology of low identifying accuracy resulting from that identifying of whether a standard picture contains watermark information is apt to be interfered with by a human body or textures in clothes, a method for identifying whether a standard picture contains a watermark is particularly provided. The method may depend on a computer program which may be run on a computer system of the Von Neumann Architecture. The computer program may be an image identifying program for standard pictures, an IT application having functions of identifying and comparing standard image information, for example, a certificate information identifying application or an IT system having a certificate information identifying function, a document picture optical character recognition (OCR) application, or a program having an OCR function. The computer system may be a server or terminal for operating the computer program.

In some embodiments, a method for identifying whether a standard picture contains a watermark and thereby determining whether to authorize a transaction includes: obtaining a set of sample standard pictures; adjusting sample standard pictures in the set of sample standard pictures to a preset size, the sample pictures in the set of sample standard pictures not containing watermark information; calculating an average of pixel attribute values of the sample pictures in the set of sample standard pictures at pixel positions of the preset size; normalizing the average of the pixel attribute values at the pixel positions of the preset size; obtaining watermark-presence probabilities of the pixel positions of the preset size, wherein the watermark-presence probability of the pixel positions of the preset size is defined as a complementary event probability of a probability expressed by the average of the pixel attribute values at the pixel positions of the preset size; obtaining a target picture that is adjusted to the preset size; and calculating a sum of products of pixel attribute values of the target picture at the pixel positions of the preset size and the corresponding watermark-presence probabilities at the pixel positions of the preset size; in accordance with a determination that the sum of products of the pixel attribute values of the target picture at the pixel positions of the preset size and the corresponding watermark-presence probabilities at the pixel positions of the preset size is greater than a predefined threshold value, determining that the target picture contains a watermark, and providing a predefine output prompt indicating detection of the watermark for the target picture; and in accordance with a determination that the sum of products of the pixel attribute values of the target picture at the pixel positions of the preset size and the corresponding watermark-presence probabilities at the pixel positions of the preset size is not greater than the predefined threshold value, determining that the target picture does not contain a watermark, and performing a transaction based on the target picture.

Other features of the method are described below with respect to various embodiments.

Specifically, as shown in FIG. 1, a method for identifying whether a standard picture contains a watermark includes:

Step S102: Obtain a set of sample standard pictures and adjust sample pictures in the set of sample standard pictures to a preset size.

As stated above, the standard picture may be passport photo pictures such as an identity card picture, a social security card picture, and a driver's license picture, as well as document captures and page photographs of paper documents of identical versions. The set of sample standard pictures includes a plurality of preset standard pictures as samples, and none of the plurality of standard pictures as samples contains watermark information. For example, in a scenario of an identity card identifying system, N normal picture files of identity card photos not containing watermarks may be recorded in advance and used as a set of sample standard pictures. In some embodiments, when selecting the set of sample standard pictures, a variety of parameters are used to ensure that the set of sample standard pictures are representative of a wide variety of individuals, clothing styles, hair styles, facial characteristics, clothing colors, skin colors, etc. In some embodiments, a large corpus of images are input to a sample selection program of the device, where the sample selection program categorizes the images into multiple categories based on each of multiple sets of features (e.g., clothing color, gender, hair styles, image luminance, background/person size ratio, etc.), and selects an equal number of sample pictures from each category of a respective set of categories that corresponds to each set of features of the multiple sets of features, to add to the set of sample standard pictures.

In this embodiment, the size and scale of the sample pictures in the set of sample standard pictures need to be adjusted after the sample pictures are selected to be added to the set of sample standard pictures. If the preset size is 600 pixels×300 pixels, the sample pictures are adjusted to be 600×300 picture files by scaling or cutting the sample pictures. In some embodiments, when scaling and/or cropping the pictures, the picture scaling program on the device identifies a boundary of the subject person in the image, and scales the picture such that a width and height of the subject person in the image are a predefined width and height. After the scaling, the picture scaling program either crops the boundaries of the background portion or extends the boundaries of the background portion according to the edge pixel properties (e.g., color, luminance, etc.) of the original boundaries of the scaled images such that the resulting image is of the preset size.

Step S104: Calculate an average of pixel attribute values of the sample pictures in the set of sample standard pictures at pixel positions of the preset size.

The pixel attribute values are attribute values that reflect pixel point features, and may include a gray value, a difference between a gray value and a preset background gray value, a gray gradient value, and the like. In some embodiments, an attribute value that reflects a pixel point feature may be selected based on various application-specific criteria as the pixel attribute value for calculation. In this embodiment, the use of the gray gradient value as the pixel attribute value is used as an example for description. Before the step of calculating an average of pixel attribute values of the sample pictures in the set of sample standard pictures at pixel positions of the preset size, the gray gradient values of the sample pictures in the set of sample standard pictures at the pixel positions of the preset size may also be calculated. In some embodiments, the pixel attribute value that is selected is a combined attribute of multiple basic pixel property values, such as luminance, saturation, and gradient, etc.

In this step, the size of each sample picture in the set of sample standard pictures is the preset size. In the foregoing example, the size of the sample pictures in the set of sample standard pictures is 600×300. Therefore, a pixel attribute value $D_{k,S}$ of each sample picture in the set of sample standard pictures at a pixel position S: (i,j) can be obtained. (i,j) is a pixel coordinate at the pixel position S of the preset size, and $D_{k,S}$ is a pixel attribute value of a $k^{th}$ sample picture in the set of sample standard pictures at the pixel point of the pixel position S. Then, through calculation $$D_{avg,P} = \frac{\sum_{k}^{N} D_{k,P}}{N}$$

an average $D_{avg,S}$ of the pixel attribute values of the pixel positions S is obtained, and then the average $D_{avg,S}$ of each pixel position of the preset size 600×300 is calculated, so that a graph constructed by the averages $D_{avg,S}$ is obtained.

Step S106: Normalize the average of the pixel attribute values at the pixel positions of the preset size and obtain watermark-presence probabilities of the pixel positions of the preset size.

In this embodiment, the step of normalizing the average of the pixel attribute values at the pixel positions of the preset size may specifically include: obtaining a maximum value of the average of the pixel attribute values at the pixel positions of the preset size, calculating a ration of the average of the pixel attribute values at the pixel positions of the preset size to the maximum value, and obtaining probabilities corresponding to the pixel positions of the preset size.

That is, a maximum value $D_{avg,MAX}$ of $D_{avg,S}$ may first selected from all (or substantially all) pixel positions S1, S2, S3, S4 . . . of the preset size 600×300, and then calculation is performed for each pixel position S:

$$P(i, j) = \frac{D_{avg,S}}{D_{avg,MAX}}.$$

A probability P(i,j) corresponding to each pixel position (i,j) is obtained. probability corresponding to the pixel position (i,j) is obtained after normalizing P(i,j). The probability is used for indicating the probability that there is a pixel attribute value having the characteristic of the sample standard picture at the pixel position (i,j) or the probability that the target picture is similar to the sample standard picture and does not contain watermark information at the pixel position (i,j).

Further, in this embodiment, complementary event probabilities of probabilities corresponding to the pixel positions of the preset size may also be used as the watermark-presence probabilities corresponding to the pixel positions of the preset size.

In the foregoing example, since P(i,j) indicates the probability that a picture is similar to the sample standard picture and does not contain watermark information at the pixel position (i,j), the complementary event probability 1−P(i,j) is the probability that a watermark may appear at the corresponding pixel position (i,j), that is, the watermark-presence probability.

In some embodiments, the watermark-presence probability may also be defined by other methods. In any case, the defined watermark-presence probability needs to decrease successively with increment of the probability corresponding to each pixel position of the preset size.

The watermark-presence probability can be obtained by performing calculation from step S102 to step S106 on each pixel position of the preset size.

Step S108: Obtain a target picture that is adjusted to the preset size in accordance with the methods described above with respect to adjustment made to the sample standard pictures, calculate a sum of products of pixel attribute values of the target picture at the pixel positions of the preset size and the corresponding watermark-presence probability, and determine according to the sum of products whether the target picture contains a watermark.

The input target picture is a picture in which whether a watermark is contained needs to be determined, and needs to be cut or scaled by a method the same as the one performed on the sample standard pictures, so that the input target picture is adjusted to the same preset size. For example, in the foregoing example, the input picture is adjusted to a 600×300 picture.

For example, in the foregoing example, after the target picture that is adjusted to the preset size is obtained, by the formula:

$$T = \Sigma D_{(i,j)} \times (1 - P(i,j))$$

products of pixel attribute values of the target picture at each pixel position (i,j) and the watermark-presence probability 1−P(i,j) of the corresponding pixel position (i,j) are calculated, and then the products are added to obtain T. In this embodiment, whether T is larger than or equal to a threshold may be determined, and the target picture is determined to contain a watermark if T is larger than or equal to the threshold. In some embodiments, when selecting the threshold, the device performs the same calculation for the same set of sample standard pictures with watermarks overlaid on each of the set of sample standard pictures, and the threshold value is selected based on the T values calculated for the sample standard pictures with overlaid watermarks. For example, in some embodiments, the threshold is a T value that is below the T values of more than a threshold percentage of pictures (e.g., 85% of the pictures). In some embodiments, the threshold percentage is selected in accordance with a predefined error tolerance entered by a user.

That is, in this embodiment, the pixel attribute values are selected to be gray gradient values. If an average of gray gradient values of a plurality of sample standard pictures at a pixel position (i,j) is relatively large and a variance thereof is relatively small, it indicates that there is a relatively high probability of appearance of gray change caused by gradient in the sample standard pictures due to the definition to the picture standard. For example, there is certainly a relatively large amount of profile lines in a facial area or text description area of a certificate picture due to limitation of the certificate picture standard, thereby resulting in a relatively large gradient value. If an average of gray gradient values of a plurality of sample standard pictures at a pixel position (i,j) is relatively small and a variance thereof is relatively small, it indicates that the pixel position may be a background position defined in the standard picture, and there is a relatively small probability of appearance of gray change caused by gradient in the standard picture. Therefore, after the target picture is input to the device, if the gradient value of the target picture at the pixel position (i,j) is relatively large and a gradient change of the gradient value of the sample standard picture at the position is comparatively small relative to the overall gradient change of the picture, the watermark-presence probability is relatively large and the product of the gradient value and the watermark-presence probability is relatively large:

$$D_{(i,j)} \times (1 - P(i,j)).$$

To exclude noises, the whole target picture is analyzed. That is, the product is calculated for each pixel position (i,j), and then the products are added to obtain T. Because the watermark-presence probability 1−P(i,j) is relatively small for gradient information of clothes or facial areas, interference of profile lines on clothes or facial areas on a watermark is filtered out automatically by this formulation of T value calculation, so that T reflects a difference of the target picture from the sample standard picture at the image background. Therefore, the identification is more accurate as compared to conventional edge detection-based techniques.

In another embodiment, differences between gray values and background gray values may also be selected as the pixel attribute values. In this embodiment, before the step of calculating an average of pixel attribute values of the sample pictures in the set of sample standard pictures at pixel positions of the preset size, the sample pictures in the set of sample standard pictures may be converted into gray pictures according to the background gray values.

In this embodiment, step S102 and step S104 may still be performed according to the foregoing steps. However, during normalizing, normalizing may be performed with reference to a preset background gray value of the sample standard picture. For example, if the background gray value is a background color with a gray value of 100 rather than white in the definition to the standard picture, a difference between an average of at each pixel position of the preset size and the background gray value 100 is calculated and normalizing is performed based on the difference.

According to the formula:

$$T = \Sigma D_{(i,j)} \times (1 - P(i,j))$$

during calculation, $P(i,j)$ of a pixel point in facial or clothes portions of the picture that greatly differ from the background color in the picture is relatively large, and therefore the watermark-presence probability $1-P(i,j)$ is relatively small. Therefore, the weight of pixel point in facial or clothes portions that greatly differ from the background color in the target picture in T is relatively small. For watermark information in the target picture, the position at which the watermark appears is in the background color area, $P(i,j)$ of a pixel point in the area is relatively small and the watermark-presence probability $1-P(i,j)$ is relatively large, and therefore there are pixel points having a relatively large difference from the background gray value in the area of the target picture. Moreover, when the number of such the pixel points is relatively large, T increases significantly. Therefore, it is convenient to distinguish the watermark information from the standard picture.

In another embodiment, gray values of pixel attribute values may also be used as the pixel attribute values for standard pictures using pure white or pure black as the background color. In this embodiment, before the step of calculating an average of pixel attribute values of the sample pictures in the set of sample standard pictures at pixel positions of the preset size, the method further includes converting the sample pictures in the set of sample standard pictures into binary pictures according to the gray values.

The binary picture is a black and white picture and includes only two gray values. A gray threshold may be set in advance, the gray value of a pixel point having a gray value larger than the gray threshold is set as 255, and the gray value of a pixel point having a gray value smaller than the gray threshold is set as 0. The formula is still used:

$$T = \Sigma D_{(i,j)} \times (1 - P(i,j))$$

to determine whether the target picture contains a watermark. Since $P(i,j)$ of pixel points in the background area is 0, if there is obvious watermark information in the background area of the target picture, it will be significantly reflected in T Moreover $P(i,j)$ is 1 for areas such as human face or clothes of which the gray value has a relatively large difference from that of the background, the corresponding watermark-presence probability is 0. Therefore, interference of image information in human face and clothes areas on the watermark can be filtered out, thereby increasing the detection accuracy.

It should be noted that in the embodiments in which whether a target picture contains watermark information that does not satisfy the definition to a standard picture is determined by using gray values (binary pictures are needed), differences between gray values and background gray values, and gray gradient values as pixel attribute values, the method for determining by using gray gradient values as the pixel attribute values has better performance. In the method, since only the profile information is considered and there is not excessive involvement of gray value information of pixel points in the target picture or of pixel points that may be correlated with content of the target picture, the identifying accuracy is the highest.

Figure 3:
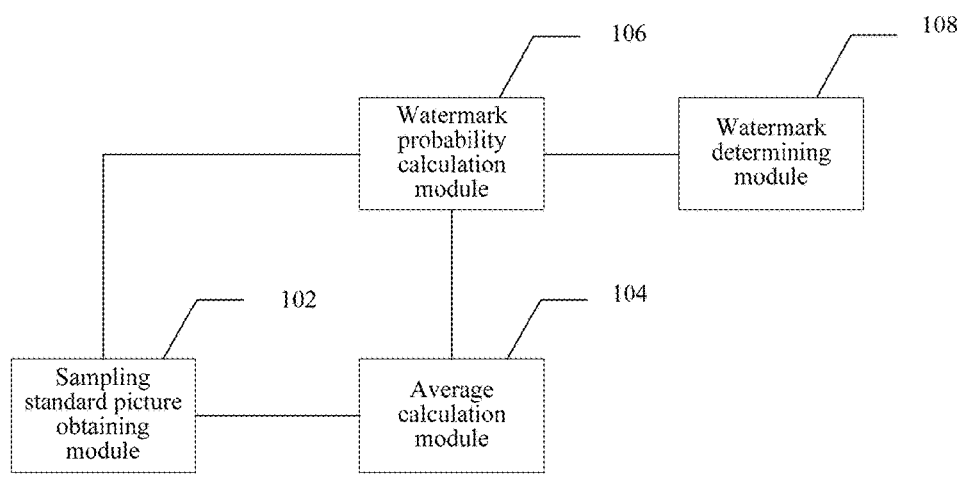
FIG. 3 is a schematic diagram of a device for identifying whether a standard picture contains a watermark according to an embodiment.

In addition, to resolve the technical problem in the conventional technology of low identifying accuracy resulting from that identifying of whether a standard picture contains watermark information is apt to be interfered with by a human body or textures in clothes, in an embodiment, as shown in FIG. 3, a device for identifying whether a standard picture contains a watermark is particularly provided. The device includes: a sample standard picture obtaining module 102, an average calculation module 104, a watermark-presence probability calculation module 106, and a watermark determining module 108. Herein:

The sample standard picture obtaining module 102 is configured to obtain a set of sample standard pictures, and adjust sample pictures in the set of sample standard pictures to a preset size, the sample pictures in the set of sample standard pictures not containing watermark information.

The average calculation module 104 is configured to calculate an average of pixel attribute values of the sample pictures in the set of sample standard pictures at pixel positions of the preset size.

The watermark-presence probability calculation module 106 is configured to normalize the average of the pixel attribute values at the pixel positions of the preset size and obtain watermark-presence probabilities of the pixel positions of the preset size.

The watermark determining module 108 is configured to obtain a target picture that is adjusted to the preset size, calculate a sum of products of pixel attribute values of the target picture at the pixel positions of the preset size and the corresponding watermark-presence probabilities, and determine according to the sum of products whether the target picture contains a watermark.

In an embodiment, the pixel attribute values are gray gradient values. The average calculation module 104 is further configured to calculate the gray gradient values of the sample pictures in the set of sample standard pictures at the pixel positions of the preset size.

In an embodiment, the pixel attribute values are differences between gray values and background gray values. The average calculation module 104 is further configured to convert the sample pictures in the set of sample standard pictures into gray pictures according to the background gray values.

In an embodiment, the pixel attribute values are gray values. The average calculation module 104 is further configured to convert the sample pictures in the set of sample standard pictures into binary pictures according to the gray values.

In an embodiment, the watermark-presence probability calculation module 106 is further configured to obtain a maximum value of the average of the pixel attribute values at the pixel positions of the preset size, calculate a ratio of the average of the pixel attribute values at the pixel positions of the preset size to the maximum value, and obtain probabilities corresponding to the pixel positions of the preset size.

In an embodiment, the watermark-presence probability calculation module 106 is further configured to calculate complementary event probabilities of probabilities corresponding to the pixel positions of the preset size as the watermark-presence probabilities corresponding to the pixel positions of the preset size.

In an embodiment, the watermark determining module 108 is further configured to determine whether the watermark-presence probability evaluation value is larger than or equal to a threshold and determine that the target picture contains a watermark if the watermark-presence probability evaluation value is larger than or equal to the threshold.

By implementing the embodiments of the present technology, the following beneficial effects are obtained:

By using the method and device for determining whether a standard picture contains a watermark, first watermark-presence probabilities at all (or substantially all) pixel positions of a preset size that greatly differ from pixel attribute values of the background region are obtained according to a set of sample standard pictures without watermarks, an input target picture is then received, and a sum of products of pixel attribute values at all (or substantially all) pixel points in the target picture and the watermark-presence probabilities at the corresponding pixel positions are then calculated. In the sum, the watermark-presence probability of occurrence of pixel attribute change in the pixel attributes on a human face or clothes is small, and therefore, interference of profile information of the human face or clothes on watermark identification can be ignored. As regards the watermark information in the background region, the watermark-presence probability is relatively large. If a watermark appears in the background region, relatively large pixel attribute values appear in the region. The relatively large pixel attribute values are then multiplied with relatively large watermark-presence probabilities, and then the products are added to obtain a relatively large sum. Therefore, whether the standard picture contains a watermark can be determined according to the relatively large sum. Moreover, since profile lines existing in the human face and clothes are filtered out, the determining result is more accurate.

Figure 4:
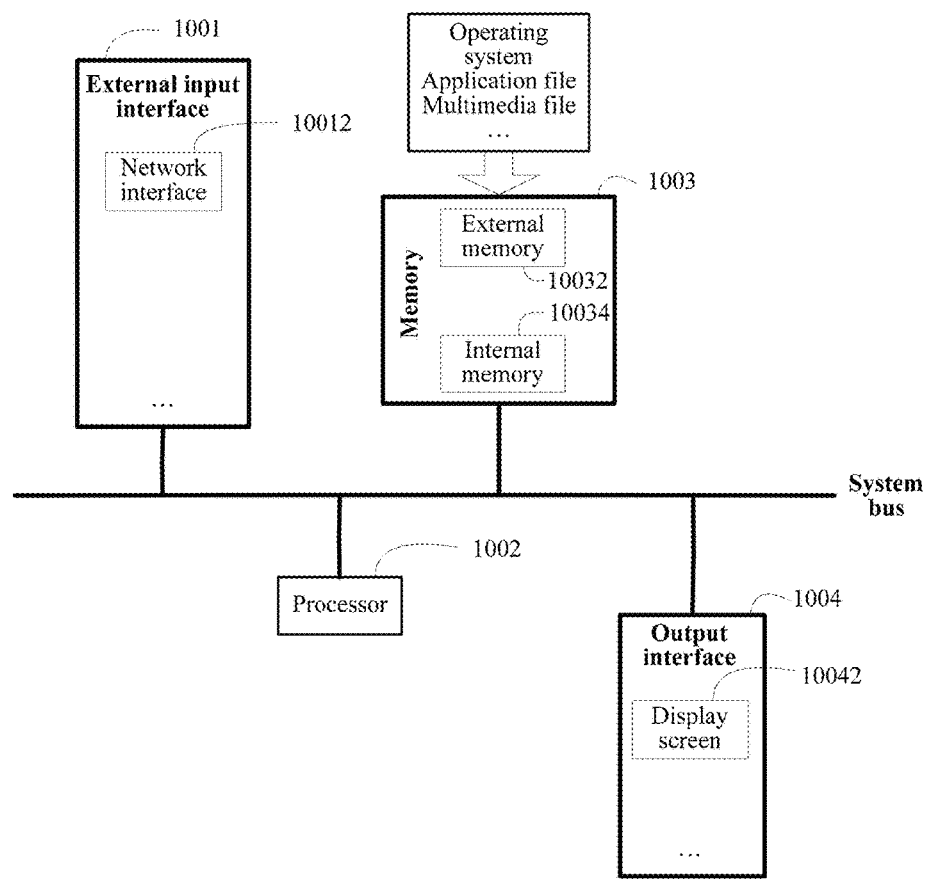
FIG. 4 is a schematic structural diagram of a computer system for running the foregoing method for identifying whether a standard picture contains a watermark according to an embodiment.

In an embodiment, as shown in FIG. 4, FIG. 4 shows a Von Neumann Architecture-based computer system for operating the method for identifying whether a standard picture contains a watermark. The computer system may be a terminal device such as a smartphone, a tablet computer, a palm computer, a notebook computer, or a personal computer. Specifically, the computer system may include an external input interface 1001, a processor 1002, a memory 1003, and an output interface 1004 that are connected by means of a system bus. Optionally, the external input interface 1001 may include at least a network interface 10012. The memory 1003 may include an external memory 10032 (for example, a hard disk, an optical disc, or a floppy disk) and an internal memory 10034. The output interface 1004 may include at least a device such as a display screen 10042.

In this embodiment, the method is operated based on a computer program. Program files of the computer program are stored in the external memory 10032 of the Von Neumann Architecture-based computer system. When the computer program is to be operated, the program files are loaded to the internal memory 10034, compiled into machine code, and then transmitted to the processor 1002 for execution, so that the logical sample standard picture obtaining module 102, average calculation module 104, watermark-presence probability calculation module 106, and watermark determining module 108 are formed in the Von Neumann Architecture-based computer system. In addition, in the process of executing the method for determining whether a standard picture contains a watermark, all input parameters are received by means of the external input interface 1001, transmitted to the memory 1003 for buffering, and then input to the processor 1002 for processing. The processed result data is either buffered in the memory 1003 for subsequent processing or transmitted to the output interface 1004 for outputting.

According to the implementations of the present disclosure, a non-volatile machine readable storage medium is further provided. The non-volatile machine readable storage medium is configured to store a program product for identifying whether a standard picture contains a watermark. The program product may include the sample standard picture obtaining module 102, the average calculation module 104, the watermark-presence probability calculation module 106, and the watermark determining module 108. The program product may be called by the computer system for performing the method for identifying whether a standard picture contains a watermark.

The above descriptions are merely preferred embodiments of the present technology, and certainly cannot be used to limit the scope of the claims of the present disclosure. Equivalent changes made according to the claims of the present disclosure still fall within the scope of the present disclosure.

What is claimed is:

1. A method for identifying whether a standard picture contains a watermark, comprising:
at a device having one or more processors and memory:
obtaining a set of sample standard pictures;
adjusting sample standard pictures in the set of sample standard pictures to a preset size, the sample pictures in the set of sample standard pictures not containing watermark information;
calculating an average of pixel attribute values of the sample pictures in the set of sample standard pictures at pixel positions of the preset size;
normalizing the average of the pixel attribute values at the pixel positions of the preset size;
obtaining watermark-presence probabilities of the pixel positions of the preset size, wherein the watermark-presence probability of the pixel positions of the preset size is defined as a complementary event probability of a probability expressed by the average of the pixel attribute values at the pixel positions of the preset size;
obtaining a target picture that is adjusted to the preset size; and
calculating a sum of products of pixel attribute values of the target picture at the pixel positions of the preset size and the corresponding watermark-presence probabilities at the pixel positions of the preset size;
in accordance with a determination that the sum of products of the pixel attribute values of the target picture at the pixel positions of the preset size and the corresponding watermark-presence probabilities at the pixel positions of the preset size is greater than a predefined threshold value, determining that the target picture contains a watermark, and providing a predefine output prompt indicating detection of the watermark for the target picture; and
in accordance with a determination that the sum of products of the pixel attribute values of the target picture at the pixel positions of the preset size and the corresponding watermark-presence probabilities at the pixel positions of the preset size is not greater than the predefined threshold value, determining that the target picture does not contain a watermark, and performing a transaction based on the target picture.

2. The method for identifying whether a standard picture contains a watermark according to claim 1, wherein the pixel attribute values are gray gradient values; and before calculating the average of pixel attribute values of the sample pictures in the set of sample standard pictures at the pixel positions of the preset size, the method further comprises:

calculating the gray gradient values of the sample pictures in the set of sample standard pictures at the pixel positions of the preset size.

3. The method for identifying whether a standard picture contains a watermark according to claim 1, wherein the pixel attribute values are differences between gray values at the pixel positions of the preset size and predefined background gray values; and before calculating the average of pixel attribute values of the sample pictures in the set of sample standard pictures at the pixel positions of the preset size, the method further comprises:

converting the sample pictures in the set of sample standard pictures into grayscale pictures according to the predefined background gray values.

4. The method for identifying whether a standard picture contains a watermark according to claim 1, wherein the pixel attribute values are gray values; and before calculating the average of pixel attribute values of the sample pictures in the set of sample standard pictures at the pixel positions of the preset size, the method further comprises:

converting the sample pictures in the set of sample standard pictures into binary pictures according to the gray values at the pixel positions of the preset size.

5. The method for identifying whether a standard picture contains a watermark according to claim 1, wherein normalizing the average of the pixel attribute values at the pixel positions of the preset size comprises:

obtaining a maximum value of the average of the pixel attribute values at the pixel positions of the preset size, calculating a ratio of the average of the pixel attribute values at the pixel positions of the preset size to the maximum value, and obtaining the probabilities corresponding to the pixel positions of the preset size that are expressed by the average of the pixel attribute values at the pixel positions of the preset size.

6. The method for identifying whether a standard picture contains a watermark according to claim 5, wherein obtaining watermark-presence probabilities corresponding to the pixel positions of the preset size comprises:

calculating the complementary event probabilities of the probabilities corresponding to the pixel positions of the preset size as the watermark-presence probabilities corresponding to the pixel positions of the preset size.

7. The method for identifying whether a standard picture contains a watermark according to claim 6, wherein providing the a predefine output prompt indicating detection of the watermark for the target picture includes outputting an error message rejecting the target picture as authorization information for performing a requested transaction.

8. A device for identifying whether a standard picture contains a watermark, comprising:

one or more processors; and memory storing instructions, the instructions, when executed by the one or more processors, cause the processors to perform:

obtaining a set of sample standard pictures;

adjusting sample standard pictures in the set of sample standard pictures to a preset size, the sample pictures in the set of sample standard pictures not containing watermark information;

calculating an average of pixel attribute values of the sample pictures in the set of sample standard pictures at pixel positions of the preset size;

normalizing the average of the pixel attribute values at the pixel positions of the preset size;

obtaining watermark-presence probabilities of the pixel positions of the preset size, wherein the watermark-presence probability of the pixel positions of the preset size is defined as a complementary event probability of a probability expressed by the average of the pixel attribute values at the pixel positions of the preset size;

obtaining a target picture that is adjusted to the preset size; and calculating a sum of products of pixel attribute values of the target picture at the pixel positions of the preset size and the corresponding watermark-presence probabilities at the pixel positions of the preset size;

in accordance with a determination that the sum of products of the pixel attribute values of the target picture at the pixel positions of the preset size and the corresponding watermark-presence probabilities at the pixel positions of the preset size is greater than a predefined threshold value, determining that the target picture contains a watermark, and providing a predefine output prompt indicating detection of the watermark for the target picture; and in accordance with a determination that the sum of products of the pixel attribute values of the target picture at the pixel positions of the preset size and the corresponding watermark-presence probabilities at the pixel positions of the preset size is not greater than the predefined threshold value, determining that the target picture does not contain a watermark, and performing a transaction based on the target picture.

9. The device for identifying whether a standard picture contains a watermark according to claim 8, wherein the pixel attribute values are gray gradient values; and before calculating the average of pixel attribute values of the sample pictures in the set of sample standard pictures at the pixel positions of the preset size, the operations further comprise:

calculating the gray gradient values of the sample pictures in the set of sample standard pictures at the pixel positions of the preset size.

10. The device for identifying whether a standard picture contains a watermark according to claim 8, wherein the pixel attribute values are differences between gray values at the pixel positions of the preset size and predefined background gray values; and before calculating the average of pixel attribute values of the sample pictures in the set of sample standard pictures at the pixel positions of the preset size, the operations further comprise:

converting the sample pictures in the set of sample standard pictures into grayscale pictures according to the predefined background gray values.

11. The device for identifying whether a standard picture contains a watermark according to claim 8, wherein the pixel attribute values are gray values; and before calculating the average of pixel attribute values of the sample pictures in the set of sample standard pictures at the pixel positions of the preset size, the operations further comprise:
converting the sample pictures in the set of sample standard pictures into binary pictures according to the gray values at the pixel positions of the preset size.

12. The device for identifying whether a standard picture contains a watermark according to claim 8, wherein normalizing the average of the pixel attribute values at the pixel positions of the preset size comprises:
obtaining a maximum value of the average of the pixel attribute values at the pixel positions of the preset size, calculating a ratio of the average of the pixel attribute values at the pixel positions of the preset size to the maximum value, and obtaining the probabilities corresponding to the pixel positions of the preset size that are expressed by the average of the pixel attribute values at the pixel positions of the preset size.

13. The device for identifying whether a standard picture contains a watermark according to claim 12, wherein obtaining watermark-presence probabilities corresponding to the pixel positions of the preset size comprises:
calculating the complementary event probabilities of the probabilities corresponding to the pixel positions of the preset size as the watermark-presence probabilities corresponding to the pixel positions of the preset size.

14. The device for identifying whether a standard picture contains a watermark according to claim 13, wherein providing the a predefine output prompt indicating detection of the watermark for the target picture includes outputting an error message rejecting the target picture as authorization information for performing a requested transaction.

15. A non-transitory computer-readable storage medium for identifying whether a standard picture contains a watermark, the computer-readable storage medium storing instructions, the instructions, when executed by one or more processors, cause the processors to perform:
obtaining a set of sample standard pictures;
adjusting sample standard pictures in the set of sample standard pictures to a preset size, the sample pictures in the set of sample standard pictures not containing watermark information;
calculating an average of pixel attribute values of the sample pictures in the set of sample standard pictures at pixel positions of the preset size;
normalizing the average of the pixel attribute values at the pixel positions of the preset size;
obtaining watermark-presence probabilities of the pixel positions of the preset size, wherein the watermark-presence probability of the pixel positions of the preset size is defined as a complementary event probability of a probability expressed by the average of the pixel attribute values at the pixel positions of the preset size;
obtaining a target picture that is adjusted to the preset size; and
calculating a sum of products of pixel attribute values of the target picture at the pixel positions of the preset size and the corresponding watermark-presence probabilities at the pixel positions of the preset size;
in accordance with a determination that the sum of products of the pixel attribute values of the target picture at the pixel positions of the preset size and the corresponding watermark-presence probabilities at the pixel positions of the preset size is greater than a predefined threshold value, determining that the target picture contains a watermark, and providing a predefine output prompt indicating detection of the watermark for the target picture; and in accordance with a determination that the sum of products of the pixel attribute values of the target picture at the pixel positions of the preset size and the corresponding watermark-presence probabilities at the pixel positions of the preset size is not greater than the predefined threshold value, determining that the target picture does not contain a watermark, and performing a transaction based on the target picture.

16. The computer-readable storage medium for identifying whether a standard picture contains a watermark according to claim 15, wherein the pixel attribute values are gray gradient values; and
before calculating the average of pixel attribute values of the sample pictures in the set of sample standard pictures at the pixel positions of the preset size, the operations further comprise:
calculating the gray gradient values of the sample pictures in the set of sample standard pictures at the pixel positions of the preset size.

17. The computer-readable storage medium for identifying whether a standard picture contains a watermark according to claim 15, wherein the pixel attribute values are differences between gray values at the pixel positions of the preset size and predefined background gray values; and
before calculating the average of pixel attribute values of the sample pictures in the set of sample standard pictures at the pixel positions of the preset size, the operations further comprise:
converting the sample pictures in the set of sample standard pictures into grayscale pictures according to the predefined background gray values.

18. The computer-readable storage medium for identifying whether a standard picture contains a watermark according to claim 15, wherein the pixel attribute values are gray values; and
before calculating the average of pixel attribute values of the sample pictures in the set of sample standard pictures at the pixel positions of the preset size, the operations further comprise:
converting the sample pictures in the set of sample standard pictures into binary pictures according to the gray values at the pixel positions of the preset size.

19. The computer-readable storage medium for identifying whether a standard picture contains a watermark according to claim 15, wherein normalizing the average of the pixel attribute values at the pixel positions of the preset size comprises:
obtaining a maximum value of the average of the pixel attribute values at the pixel positions of the preset size, calculating a ratio of the average of the pixel attribute values at the pixel positions of the preset size to the maximum value, and obtaining the probabilities corresponding to the pixel positions of the preset size that are expressed by the average of the pixel attribute values at the pixel positions of the preset size.

20. The computer-readable storage medium for identifying whether a standard picture contains a watermark according to claim 19, wherein obtaining watermark-presence probabilities corresponding to the pixel positions of the preset size comprises:
calculating the complementary event probabilities of the probabilities corresponding to the pixel positions of the preset size as the watermark-presence probabilities corresponding to the pixel positions of the preset size.

* * * * *